US010647878B2

(12) United States Patent
Webster et al.

(10) Patent No.: US 10,647,878 B2
(45) Date of Patent: May 12, 2020

(54) AMPHIPHILIC SILOXANE-POLYURETHANE FOULING-RELEASE COATINGS AND USES THEREOF

(71) Applicant: NDSU RESEARCH FOUNDATION, Fargo, ND (US)

(72) Inventors: Dean C. Webster, Fargo, ND (US); Teluka Galhenage, Fargo, ND (US)

(73) Assignee: NDSU RESEARCH FOUNDATION, Fargo, ND (US)

( * ) Notice: Subject to any disclaimer, the term of this patent is extended or adjusted under 35 U.S.C. 154(b) by 223 days.

(21) Appl. No.: 15/576,399

(22) PCT Filed: Jun. 1, 2016

(86) PCT No.: PCT/US2016/035176
§ 371 (c)(1),
(2) Date: Nov. 22, 2017

(87) PCT Pub. No.: WO2016/196565
PCT Pub. Date: Dec. 8, 2016

(65) Prior Publication Data
US 2018/0163087 A1    Jun. 14, 2018

Related U.S. Application Data

(60) Provisional application No. 62/169,514, filed on Jun. 1, 2015.

(51) Int. Cl.
*C09D 175/08* (2006.01)
*C08G 18/62* (2006.01)
(Continued)

(52) U.S. Cl.
CPC ......... *C09D 175/08* (2013.01); *C08G 18/283* (2013.01); *C08G 18/289* (2013.01);
(Continued)

(58) Field of Classification Search
None
See application file for complete search history.

(56) References Cited

U.S. PATENT DOCUMENTS 3,905,929 A * 9/1975 Noll ................... C08G 18/4009
524/839
5,045,599 A * 9/1991 Murase ................. C09K 3/18
525/102
(Continued)

FOREIGN PATENT DOCUMENTS

WO    WO-2015056744 A1 *  4/2015  ............ C08F 290/06

OTHER PUBLICATIONS

Pires et al. "A new tailor-maid polyisocyanate for two-pack waterborne polyurethane coatings" Surface Coatings International Part B: Coatings Transactions, vol. 85, 2002, 169-242. (Year: 2002).*
(Continued)

*Primary Examiner* — Robert S Loewe
(74) *Attorney, Agent, or Firm* — J.A. Lindeman & Co. PLLC

(57) ABSTRACT

The invention is directed to curable polyurethane coating compositions which may be used to form fouling release coatings, e.g., for use in protecting boat hulls. The curable polyurethane coating compositions of the invention comprise (a) a prepolymer made by reacting at least one polyisocyanate with (i) at least one monocarbinol-terminated poly(dimethylsiloxane), (ii) at least one methoxy-terminated poly(ethylene glycol), or (iii) mixtures thereof, (b) at least one polyol, and (c) at least one polyisocyanate crosslinker. The invention also relates to the prepolymer used in the curable coating compositions. The invention further relates to methods for reducing or preventing biofouling of a surface exposed to an aqueous environment comprising the steps of coating the surface with a curable coating compo- (Continued)

sition of the invention to form a coated surface, and curing the coating coating composition on the coated surface.

18 Claims, 15 Drawing Sheets

(51) Int. Cl.
    *C08G 18/72* (2006.01)
    *C08G 18/75* (2006.01)
    *C08G 18/79* (2006.01)
    *C08G 18/80* (2006.01)
    *C08G 18/28* (2006.01)
    *C09D 175/04* (2006.01)
    *C09D 5/16* (2006.01)

(52) U.S. Cl.
    CPC ....... *C08G 18/6229* (2013.01); *C08G 18/725* (2013.01); *C08G 18/755* (2013.01); *C08G 18/792* (2013.01); *C08G 18/8064* (2013.01); *C09D 5/1637* (2013.01); *C09D 175/04* (2013.01)

(56) References Cited

U.S. PATENT DOCUMENTS

| | | | | |
|---|---|---|---|---|
| 5,321,083 | A * | 6/1994 | Hanada | C08G 18/61 |
| | | | | 524/506 |
| 5,621,042 | A * | 4/1997 | Hanada | C08F 8/42 |
| | | | | 525/102 |
| 5,714,561 | A | 2/1998 | Chin et al. | |
| 2002/0127413 | A1* | 9/2002 | Shores | B32B 27/40 |
| | | | | 428/447 |
| 2003/0027917 | A1 | 2/2003 | Namiki et al. | |
| 2003/0149227 | A1 | 8/2003 | Okazaki | |
| 2004/0181008 | A1* | 9/2004 | Hanazawa | C08G 18/2885 |
| | | | | 524/589 |
| 2008/0139775 | A1* | 6/2008 | Wu | C08G 18/4063 |
| | | | | 428/44 |
| 2008/0153982 | A1 | 6/2008 | Lai et al. | |
| 2008/0194775 | A1 | 8/2008 | Blum et al. | |
| 2010/0062168 | A1* | 3/2010 | Poppe | C08G 18/289 |
| | | | | 427/387 |
| 2010/0063238 | A1* | 3/2010 | Zhang | C07D 251/34 |
| | | | | 528/58 |
| 2010/0167033 | A1* | 7/2010 | Poppe | B05D 7/577 |
| | | | | 428/213 |
| 2010/0280148 | A1 | 11/2010 | Webster et al. | |
| 2011/0135905 | A1* | 6/2011 | Wakita | C08F 283/12 |
| | | | | 428/221 |
| 2014/0221523 | A1* | 8/2014 | Jan | C08F 230/08 |
| | | | | 523/107 |
| 2014/0295089 | A1* | 10/2014 | Li | C08G 18/61 |
| | | | | 427/385.5 |
| 2014/0371410 | A1* | 12/2014 | Jan | C07C 271/24 |
| | | | | 526/246 |

OTHER PUBLICATIONS

Data sheet for Monoterminal Silaplane FM-1425, 1 page, 2019. (Year: 2019).*
International Search Report and Written Opinion in International Application No. PCT/US2016/035176, dated Dec. 28, 2016.
International Preliminary Report on Patentability in International Application No. PCT/US2016/035176, dated Dec. 14, 2017.

* cited by examiner

AMPHIPHILIC SILOXANE-POLYURETHANE FOULING-RELEASE COATINGS AND USES THEREOF

CROSS-REFERENCE TO RELATED APPLICATIONS

This application claims priority to PCT International Application No. PCT/US2016/035176, filed Jun. 1, 2016; and U.S. Provisional Application No. 62/169,514, filed Jun. 1, 2015, which is incorporated herein by reference.

STATEMENT OF US GOVERNMENT SUPPORT

This invention was made with government support under N00014-12-1-0482 awarded by the Office of Naval Research (ONR). The US government has certain rights in the invention.

BACKGROUND OF THE INVENTION

Bio-fouling is the buildup of micro and macro organisms on all materials that are immersed in natural bodies of water (Yebra et al., 2004). Contending with biofouling has been a challenging problem since the beginning of navigation (Hellio and Yebra, 2009). Extensive and rapid buildup of fouling on the ship hull cause reduction in ship speed and maneuverability which in turn increases operating costs and environmental penalties (Magin et al., 2010; Callow and Callow, 2002). In the medieval age, copper and lead sheathing covering the ship hulls were used as the primary method of controlling biofouling (Hellio and Yebra, 2009). Advancement in polymer and resin technology in the 1960's led to the use of self-polishing copolymers with controlled release of biocides such as Tributyl tin (TBT), (Yebra et al., 2004; Hellio and Yebra, 2009). However, by the 1970s, deleterious effects of TBT towards aquatic life started to appear. The International Maritime Organization addressed the issues of TBT by placing restrictions that later established protocols for complete prohibition of tin based antifouling paints in 2003 (Yebra et al., 2004). Antifouling technologies using copper oxide as biocide had been used previously and is now the predominate biocide used in commercial antifouling coatings (Konstantinou and Albanis, 2004). Due to concerns regarding the release of biocides into the environment, a considerable amount of research has been carried out towards using non-toxic anti-fouling (AF)/fouling release (FR) technologies that are environmentally friendly (Lejars et al., 2012).

Fouling release coatings systems primarily consist of silicone elastomers which allow only the weak attachment of fouling organisms which are removed due to hydrodynamic forces (Lejars et al., 2012). However these silicone based fouling release coatings have some drawbacks such as deterioration of fouling release properties over time and poor mechanical durability compared to anti-fouling coatings with controlled release of biocides (Yebra et al., 2004; Lejars et al., 2012). Siloxane polyurethane fouling release coatings developed by Webster and coworkers have been able to address the issues with durability by incorporating polydimethyl siloxane (PDMS) in to a polyurethane matrix (Webster and Ekin, 2010; Webster et al. 2011). Self-stratification PDMS provides the FR properties on par with commercial FR coatings and polyurethane bulk provides mechanical performance that is a magnitude higher than silicone elastomers (Ekin and Webster, 2006; Bodkhe et al., 2012b; Sommer et al. 2010). Unlike silicone elastomer-based FR coatings, siloxane polyurethane coating systems have excellent adhesion to primers which eliminates the need for a separate tie-coat (Bodkhe et al., 2012b).

Adhesion of marine organisms to surfaces is a complex phenomenon (Yebra et al., 2004; Hellio and Yebra, 2009). However, the primary method of adhesion involves spreading of an adhesive that consists of complex protein or glycoprotein (Iguerb et al., 2008). Therefore, materials modified with polyethylene glycol (PEG) are of great interest mainly due to their ability to resist protein adhesion (Wyszogrodzka and Haag, 2009). Self-assembled mono layers (SAM) containing PEG are commonly used as protein resistant materials (Wyszogrodzka and Haag, 2009; Szleifer 1997). However, SAMs are not practical for use as marine coatings (Prime and Whitesides, 1993). Polyurethanes modified with PEG, on the other hand, have demonstrated their versatility in biomedical applications, and surface domination of PEG plays a key role in protein resistance.

In previous attempts to modify siloxane polyurethanes with polyethylene glycol, amino propyl-terminated siloxane with pendent PEG chains provided amphiphilic coatings with improved algae removal compared to $1^{st}$ generation siloxane polyurethane coatings (Bodkhe, 2011). However, the synthesis of polydimethyl siloxane with pendent PEG chains involves multiple steps.

SUMMARY OF THE INVENTION

The invention is directed to a curable polyurethane coating composition which may be used to form fouling release coatings, e.g., for use in protecting boat hulls. Generally, the coatings of the invention are termed "anti-fouling" for their ability to reduce or prevent adhesion of biological or organic matter, such as proteins, bacteria, and the like to the coated surfaces, for example, of boat hulls.

The curable polyurethane coating compositions of the invention comprise (a) a prepolymer made by reacting at least one polyisocyanate with (i) at least one monocarbinol-terminated poly(dimethylsiloxane), (ii) at least one methoxy-terminated poly(ethylene glycol), or (iii) mixtures thereof, (b) at least one polyol, and (c) at least one polyisocyanate crosslinker. Coating compositions of the invention may comprise isophorone diisocyanate-polyethylene glycol-polydimethyl siloxane (IPDI-PEG-PDMS) pre-polymers with various PDMS and PEG molecular weight. IPDI trimer may be reacted with monocarbinol-terminated polydimethyl siloxane and polyethylene glycol methyl ether (m-PEG) in a 3:2 isocyanate to hydroxyl ratio while maintaining 5-10 weight % of PDMS and PEG content based on the overall coating formulation. Synthesis of the pre-polymer may be confirmed by Fourier Transform Infrared spectroscopy (FTIR) and these pre-polymers may then be used to formulate siloxane polyurethane fouling release coatings. Attenuated Total Reflectance Fourier Transformed Infrared spectroscopy (ATR-FTIR) of the coatings of the invention suggests that both siloxane and PEG are pre-dominant on the surface after water aging. Coating compositions of the invention displayed fouling release performance towards bacteria (*Cellulophaga lytica*), microalgae (*Navicula incerta*) and marine mussels (*Geukensia demissa*) on par with commercial fouling release coatings. Use of IPDI-PEG-PDMS and other pre-polymers of the invention considerably improved the fouling release performance of siloxane polyurethane coating system towards bacteria and diatoms. Therefore, coating compositions of the invention comprising isocyanate pre-polymers with PEG and PDMS modification are a viable approach towards a non-toxic tough fouling release solution.

The invention also relates to the prepolymer used in the curable coating compositions. The invention further relates to methods for reducing or preventing biofouling of a surface exposed to an aqueous environment comprising the steps of coating the surface with a curable coating composition of the invention to form a coated surface, and curing the coating composition on the coated surface.

DESCRIPTION OF THE INVENTION

The invention is directed to curable polyurethane coating compositions, which may be used to form fouling release coatings, e.g., for use in protecting boat hulls. The curable polyurethane coating composition of the invention comprises (a) a prepolymer made by reacting at least one polyisocyanate with (i) at least one monocarbinol-terminated poly(dimethylsiloxane), (ii) at least one methoxy-terminated poly(ethylene glycol), or (iii) mixtures thereof, (b) at least one polyol, and (c) at least one polyisocyanate crosslinker. Methods of inhibiting fouling on a surface exposed to aquatic conditions, such as a boat hull, comprising applying a curable polyurethane coating composition of the invention to at least a portion of said surface hull are also provided. The application also describes surfaces designed to be exposed to aqueous conditions (e.g., salt water conditions, such as seawater or brackish water, or fresh water conditions, such as found with materials in contact with lake or stream water), which are protected with a coating including the curable polyurethane coating composition of the invention.

Figure 1:
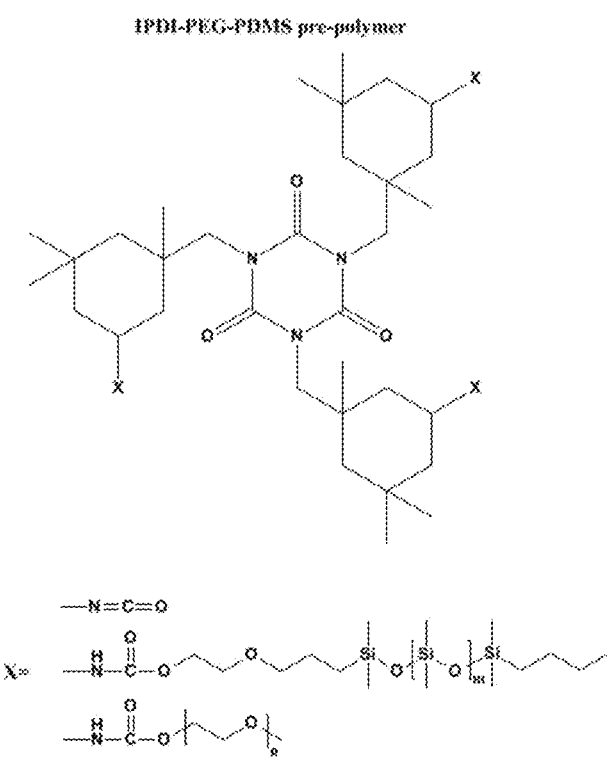
FIG. 1 depicts a general structure proposed for the prepolymers synthesized.

One embodiment of the invention relates to a prepolymer for use in a curable polyurethane coating composition of the invention. A prepolymer is made by reacting at least one polyisocyanate with (i) at least one monocarbinol-terminated poly(dimethylsiloxane), (ii) at least one methoxy-terminated poly(ethylene glycol), or (iii) mixtures thereof. To prepare a pre-polymer of the invention the poylyisocyanate may be reacted with monocarbinol-terminated polydimethyl siloxane and polyethylene glycol methyl ether (m-PEG) in an isocyanate to hydroxyl ratio where the moles of hydroxyl reacted are less than the stoichiometric amount of the isocyanate present while maintaining 5-10 weight % of PDMS and PEG content based on the overall coating formulation. For example, IPDI trimer may be reacted with monocarbinol-terminated polydimethyl siloxane and polyethylene glycol methyl ether (m-PEG) in a 3:2 isocyanate to hydroxyl ratio while maintaining 5-10 weight % of PDMS and PEG content based on the overall coating formulation. FIG. 1 depicts a general structure proposed for the prepolymers synthesized. In the structure depicted with an IPDI trimer as the exemplary polyisocyanate, X can be either an isocyanate group, PDMS chain linked through urethane or m-PEG linked through urethane. The integer "m" connotes the repeating units in the PDMS and the integer "n" the repeating units in the m-PEG.

A polyisocyanate to be used in the invention can be aromatic or aliphatic, or cycloaliphatic. Polyisocyanates based on methylene diphenyl diisocyanate ("MDI"), hexamethylene diisocyanate ("HMDI"), isophorone diisocyanate ("IPDI"), and the like can be used. Preferably, the polyisocyanate is an isophorone-based polyisocyanate. In one embodiment, the polyisocyanate is a polyisocyanate having at least three isocyanate groups such as an MDI trimer, an IPDI trimer (Desmodur Z4470 BA), and an HDI trimer (Desmodur N3300 A). Other polyisocyanates known in the art may also be used. Examples include Desmodur HL, Desmodur IL, triisocyanatononane, Desmodur RE, Desmodur RFE.

A monocarbinol-terminated polydimethyl siloxane (PDMS) used in the invention may range in molecular weight from 500 to 15,000 g/mole or from 1000 to 10,000 g/mole. In certain embodiments, the monocarbinol-terminated polydimethyl siloxane (PDMS) may have molecular weight of 1000, of 5000, or of 10,000 g/mole.

A methoxy-terminated poly(ethylene glycol), also called a polyethylene glycol methyl ether, (m-PEG) use in the invention may have a molecular weight ranging from 350 to 2,000 g/mole or from 500 to 800 g/mole. In certain embodiments it may be an m-PEG having a molecular weight of 550 or of 750 g/mole.

The prepolymer may be prepared by first dissolving the polyisocyanate in a suitable organic solvent or mixture of organic solvents. Suitable organic solvents include, but are not limited to, ethyl-3-ethoxypropionate (EEP), butyl acetate, t-butyl acetate, amyl acetate, acetone, methylethyl ketone, methyl amyl ketone, N,N-dimethyl formamide, N-methyl pyrollidinone, dimethyl sulfoxide, and the like. The monocarbinol-terminated polydimethyl siloxane (PDMS) and/or methoxy-terminated poly(ethylene glycol) is added to the solution together with a suitable catalyst, for example organometallic compounds or organic bases, and other such catalysts known in the art. Examples of organometallic compounds are dibutyl tin dilaurate, dibutyl tin diacetate (DBTDAc), bismuth carboxylate, and compounds of zirconium and aluminum such as K-Kat 4205, K-Kat-5218, and K-Kat-XC-6212. Examples of organic base catalysts are sold under the DABCO trade name by Air Products. DABCO is 1,4-diazabicyclo[2.2.2]octane. The reaction typically takes place at room temperature with stirring for several hours, for example, 4-12 hours.

In one embodiment, a curable polyurethane coating composition of the invention comprises (a) a prepolymer made by reacting at least one polyisocyanate with (i) at least one monocarbinol-terminated poly(dimethylsiloxane), (ii) at least one methoxy-terminated poly(ethylene glycol), or (iii) mixtures thereof, (b) at least one polyol, and (c) at least one polyisocyanate crosslinker. In a curable polyurethane coating composition of the invention, the prepolymer (a) may be present in an amount ranging from 20 wt. % to 60 wt. % or from 25 wt. % to 45 wt %. The polyol (b) may be present in an amount ranging from 20 wt. % to 60 wt. % or from 25 wt. % to 55 wt. %. The polyisocyanate crosslinker may be present in an amount ranging from 10 wt. % to 40 wt. % or from 15 wt. % to 35 wt. %. The amount of polyisocyanate crosslinker added should maintain an overall isocyanate to total hydroxyl equivalents where the isocyanate is in a slight molar excess, for example an isocyanate to hydroxyl equivalent ratio of 1.2:1 or 1.1:1, for the final coating composition. The coating composition may also contain a solvent which, if present, may be present in an amount from 0.5 wt. % to 50 wt. %, or from 2 wt. % to 45 wt. %.

A polyol used in the invention may be selected from the group consisting of polyester polyols, polyether polyols, polycarbonate polyols, and acrylic polyols, and mixtures thereof. In one embodiment, the polyol may include polyol having at least three hydroxyl groups. A mixture of polyols can also be used in formulating a polyurethane coating. Polyester polyols can include those made from the melt polycondensation of polyfunctional acids with polyfunctional alcohols or those made from the ring opening polymerization of cyclic monomers such as epsilon-caprolactone. Examples of suitable polyester polyols include, for example, poly(caprolactone) polyols, poly(hexamethylene adipate), and the like. Examples of suitable polyether polyols include, for example, poly(ethyleneglycol), poly(propylene glycol), poly(butylene glycol), poly(tetramethylene oxide), and the like. Acrylic polyols may be synthesized, typically by free radical polymerization, from a mixture of at least one hydroxy functional monomer plus one or more non-functional monomers. Suitable hydroxy-functional monomers include, for example, hydroxyethyl acrylate, hydroxyethyl methacrylate, hydroxypropyl acrylate, hydroxypropyl methacrylate, and the like. Examples of non-functional monomers include, for example, styrene, methyl methacrylate, methyl acrylate, butyl methacrylate, butyl acrylate, lauryl methacrylate, lauryl acrylate, 2-ethylhexyl acrylate, 2-ethyl hexyl methacrylate, and the like. The acrylic polyol may be synthesized in solution using a thermally-activated free radical initiator. The polyol can be synthesized in either a batch, semi-batch or continuous process. Examples of free radical initiators are benzoyl peroxide, t-amyl peroxy-2-ethylhexanoate, t-butyl hydroperoxide, di-t-butyl peroxide, azobisisobutyronitrile, azobisisovaleronitrile, and the like. The acrylic polyol may be made by free radical polymerization and then diluted in a solvent, such as toluene, xylene, methylisobutyl ketone, and the like. In one embodiment, the polyol may include a polycaprolactone polyol such as a polycaprolactone triol. One example of an acrylic polyol for use in a coating composition of the invention is an acrylic polyol composed of 80% butyl acrylate and 20% 2-hydroxy ethyl acrylate by weight.

The polyisocyanate crosslinker may be the same or different as the polyisocyanate described above for the prepolymer material. Catalysts for the crosslinking can be either organometallic complexes or organic bases, and other such catalysts known in the art. Examples of organometallic compounds are dibutyl tin dilaurate, dibutyl tin diacetate, bismuth carboxylate, and compounds of zirconium and aluminum such as K-Kat 4205, K-Kat-5218, and K-Kat-XC-6212. Examples of organic base catalysts are sold under the DABCO trade name by Air Products. DABCO is 1,4-diazabicyclo[2.2.2]octane. Suitable examples of isocyanate reaction catalysts include diethyl tin diacetate, dibuyltin diacetate, dibutyltin dilaurate, dibutyltin maleate, dilauryltin diacetate, dioctyltin diacetate, or a mixture thereof. In one embodiment the isocyanate reaction catalyst includes a tin catalyst. The curable polyurethane coating compositions may also be formulated with or without solvents.

A coating composition of the invention, as mentioned above, may be a solvent-free coating composition or may optionally contain a solvent such as, for example, acetone, THF, methyl ethyl ketone (MEK), xylene, acetone, acetylacetone, benzene, toluene, methyl amyl ketone (MAK), methyl isobutyl ketone, butyl acetate, t-butyl acetate, ethyl 3-ethoxypropionate (EEP), isopropanol, aromatic 100, aromatic 150, tetrahydrofuran, diethyl ether, butanol, butoxyethanol, etc. The coating composition may be a solution in such a solvent or mixture of solvents.

The coating composition may also include a pot life extender, such as, for example, alkane-2,4-dione (e.g., 2,4-pentadione), N,N-dialkyl acetoacetamide, alkyl acetoacetate, and the like. These, and the other common additives discussed below, may be included in amounts known in the art for their use.

According to particular embodiments of the invention, a series of isophorone diisocyanate-polyethylene glycol-polydimethyl siloxane (IPDI-PEG-PDMS) pre-polymers were prepared and used to formulate siloxane polyurethane fouling release coatings. The isocyanate pre-polymer was prepared by reacting isophorone diisocyanate (IPDI) trimer with monocarbinol-terminated PDMS and polyethylene glycol methyl ether (m-PEG). The ratio of isocyanate to hydroxyl groups was maintained at 3:2 for the pre-polymer synthesis. Several variations of pre-polymers were obtained by simply varying the molecular weight of PDMS and PEG. The pre-polymers were characterized using Fourier Transformed Infrared spectroscopy (FTIR). Later, these pre-polymers were reacted with an acrylic polyol and additional isocyanate and deposited to form siloxane-polyurethane coatings. The overall PDMS and PEG content was maintained at 5 and 10 weight % based on solids of the coatings formulation. Water aged coatings were characterized using Attenuated Total Reflectance Fourier Transformed Infrared spectroscopy (ATR-FTIR). Fouling release performance of the coatings were assessed using biological assay tests for bacteria (*Cellulophaga lytica*), micro algae (*Navicula incerta*), and mussels (*Geukensia demissa*).

The invention also relates to the use of the curable polyurethane coating compositions of the invention which may be coated onto a substrate and cured using techniques known in the art. The substrate can be any common substrate such as paper, polyester films such as polyethylene and polypropylene, metals such as aluminum and steel, glass, urethane elastomers, primed (painted) substrates, and the like. In another embodiment of the invention, the invention relates to an article of manufacture comprising a coating composition of the invention.

The curable polyurethane coating compositions of the invention may be cured at room temperature (ambient cure) or at elevated temperatures (thermal cure).

As mentioned above, a curable polyurethane coating composition of the invention may further contain a pigment (organic or inorganic), if a coating having a particular color is desired, and/or additives and fillers known in the art. For example, a coating composition of the invention may further contain coating additives. Examples of such coating additives include, but are not limited to, one or more leveling, rheology, and flow control agents such as silicones, fluorocarbons, or cellulosics; extenders; reactive coalescing aids such as those described in U.S. Pat. No. 5,349,026, incorporated herein by reference; plasticizers; flatting agents; pigment wetting and dispersing agents and surfactants; ultraviolet (UV) absorbers; UV light stabilizers; tinting pigments; colorants; defoaming and antifoaming agents; anti-settling, anti-sag and bodying agents; anti-skinning agents; anti-flooding and anti-floating agents; biocides, fungicides, and mildewcides; corrosion inhibitors; thickening agents; or coalescing agents. Specific examples of such additives can be found in Raw Materials Index, published by the National Paint & Coatings Association, 1500 Rhode Island Avenue, N.W., Washington, D.C. 20005. Further examples of such additives may be found in U.S. Pat. No. 5,371,148, incorporated herein by reference.

Examples of flatting agents include, but are not limited to, synthetic silica, available from the Davison Chemical Division of W. R. Grace & Company as SYLOID®; polypropylene, available from Hercules Inc., as HERCOFLAT®; synthetic silicate, available from J. M. Huber Corporation, as ZEOLEX®.

Examples of viscosity, suspension, and flow control agents include, but are not limited to, polyaminoamide phosphate, high molecular weight carboxylic acid salts of polyamine amides, and alkylene amine salts of an unsaturated fatty acid, all available from BYK Chemie U.S.A. as ANTI TERRA®. Further examples include, but are not limited to, polysiloxane copolymers, polyacrylate solution, cellulose esters, hydroxyethyl cellulose, hydroxypropyl cellulose, polyamide wax, polyolefin wax, hydroxypropyl methyl cellulose, polyethylene oxide, and the like.

EXAMPLES

Example 1

As described below, polydimethyl siloxane and polyethylene glycol modified Isophorone diisocyanate (IPDI) pre-polymers were synthesized. Later, the pre-polymers were used to prepare siloxane polyurethane fouling release coatings according to the invention. IPDI trimer (Desmodur Z4470 BA) was diluted with EEP and reacted with polyethylene glycol methyl ether (m-PEG) and monocarbinol-terminated polydimethyl siloxane (PDMS). Three siloxane molecular weight were used (1000, 5000, and 10000 g/mole). Two molecular weight variations (550, 750 g/mole) were used for m-PEG.

1.1 Materials

Monocarbinol-terminated polydimethyl siloxane (PDMS) with three molecular weights (MCR-C12:1000, MCR-C18: 5000, MCR-C22:10000 g/mole) were purchased from Gelest Inc. Polyisocyanate Desmodur Z 4470 BA was generously provided by Bayer MaterialScience. Acetylacetone, methyl amyl ketone (MAK), ethyl-3-ethoxypropionate (EEP), polyethylene glycol methyl ether (m-PEG 550 and 750 g/mole), and dibutyltin diacetate (DBTDAc) were purchased from Sigma Aldrich. An acrylic polyol composed of 80% butyl acrylate and 20% 2-hydroxylethyl acrylate was synthesized via conventional free radical polymerization and diluted in 50% toluene was used as is. Aminopropyl-terminated polydimethyl siloxane (APT-PDMS) with molecular weight 20000 g/mole that was synthesized through ring opening equilibration reaction was used for internal control.

Intersleek 700 (IS 700), Intersleek 900 (IS 900), Intersleek 1100 SR (IS 1100SR) commercial fouling release coatings and Intergard 264 marine primer were provided by International Paint. Hempasil X3 commercial fouling release coating was provided by Hempel. Silicone elastomer, Silastic® T2 (T2) was provided by Dow Corning. Aluminum panels (4×8 in., 0.6 mm thick, type A, alloy 3003 H14) purchased from 0-lab were sand blasted and primed with Intergard 264 using air-assisted spray application. Microtiter plates were modified using circular disks (1 inch diameter) of primed aluminum.

1.2 Pre-Polymer Formulation

Table 1 contains formulation for IPDI-10%-1kPDMS-550PEG pre-polymer modified with PDMS (MW=1000) and m-PEG (MW=750). IPDI trimer Desmodur Z4470 BA, which contains 70% solids, was used as the isocyanate. First isocyanate (3.4299 g) and EEP (1.6000 g) was weighed into a 40 mL glass vial with magnetic stir bar. The content was thoroughly mixed using the vortex for 5 mins. Next, PDMS (1.6000 g), PEG (1.6000 g), and catalyst solution (0.3200 g) were added. The content was thoroughly mixed using the vortex followed by overnight mixing using magnetic stirring. The isocyanate to total hydroxyl equivalence ratio was maintained at 3:2 for all pre-polymers. FIG. 1 depicts a general structure proposed for the pre-polymers synthesized. In the structure, X can be either an isocyanate group, PDMS chain linked through urethane or m-PEG linked through urethane. The integer "m" connotes the repeating units in the PDMS and the integer "n" the repeating units in the m-PEG.

TABLE 1

Composition of the IPDI-PDMS-PEG-prepolymer Part 1

IPDI-5%-1KPDMS-550PEG-prepolymer

| Ingredients | Mw (g/mol) | Amount (g) | Wt. % | Eq. Wt (g/eq) | F1 Eq | % Solids | Amount Added (g) |
|---|---|---|---|---|---|---|---|
| Isocyanate (Desmodur Z 4470 BA) | | 2.4010 | 15.0060 | 355 | 6.76E−03 | 70 | 3.4299 |
| EEP | — | — | — | — | — | — | 1.6000 |
| Monocarbinol-terminated PDMS | 1000 | 1.6000 | 10.0000 | 1000 | 1.60E−03 | 100 | 1.6000 |
| Hydroxyl-terminated PEG-750 | 550 | 1.6000 | 10.0000 | 550 | 2.91E−03 | 100 | 1.6000 |
| DBTDAc | — | 0.0032 | 0.0200 | — | — | 1 | 0.3200 |

Table 2 describes exemplary pre-polymer compositions made according to the invention. $X_2/X_1$ ranged from (0.0347-0.2857) and $X_3/X_1$ ranged from (0.6318-0.3810), respectively.

TABLE 2

Pre-polymer Compositions

| Pre-polymer | Wt. of IPDI trimer (g) | NCO Eq. ($X_1$) | MW of PDMS | Wt. of PDMS (g) | OH Eq. from PDMS ($X_2$) | MW of m-PEG | Wt. of m-PEG (g) | OH Eq. from m-PEG ($X_3$) | EEP (g) |
|---|---|---|---|---|---|---|---|---|---|
| IPDI-5-1kPDMS-550PEG | 1.7152 | 3.38E−03 | 1000 | 0.8000 | 8.00E−04 | 550 | 0.8000 | 1.45E−03 | 1.6000 |
| IPDI-5-5kPDMS-550PEG | 1.2283 | 2.42E−03 | 5000 | 0.8000 | 1.60E−04 | 550 | 0.8000 | 1.45E−03 | 1.6000 |
| IPDI-5-10kPDMS-550PEG | 1.1675 | 2.30E−03 | 10000 | 0.8000 | 8.00E−05 | 550 | 0.8000 | 1.45E−03 | 1.6000 |
| IPDI-5-1kPDMS-750PEG | 1.4199 | 2.80E−03 | 1000 | 0.8000 | 8.00E−04 | 750 | 0.8000 | 1.07E−03 | 1.6000 |
| IPDI-5-5kPDMS-750PEG | 0.9330 | 1.84E−03 | 5000 | 0.8000 | 1.60E−04 | 750 | 0.8000 | 1.07E−03 | 1.6000 |
| IPDI-5-10kPDMS-750PEG | 0.8722 | 1.72E−03 | 10000 | 0.8000 | 8.00E−05 | 750 | 0.8000 | 1.07E−03 | 1.6000 |
| IPDI-10-1kPDMS-550PEG | 3.4299 | 6.76E−03 | 1000 | 1.6000 | 1.60E−03 | 550 | 1.6000 | 2.91E−03 | 1.6000 |
| IPDI-10-5kPDMS-550PEG | 2.4567 | 4.84E−03 | 5000 | 1.6000 | 3.20E−04 | 550 | 1.6000 | 2.91E−03 | 1.6000 |
| IPDI-10-10kPDMS-550PEG | 2.3351 | 4.60E−03 | 10000 | 1.6000 | 1.60E−04 | 550 | 1.6000 | 2.91E−03 | 1.6000 |
| IPDI-10-1kPDMS-750PEG | 2.8400 | 5.60E−03 | 1000 | 1.6000 | 1.60E−03 | 750 | 1.6000 | 2.13E−03 | 1.6000 |
| IPDI-10-5kPDMS-750PEG | 1.8663 | 3.68E−03 | 5000 | 1.6000 | 3.20E−04 | 750 | 1.6000 | 2.13E−03 | 1.6000 |
| IPDI-10-10kPDMS-750PEG | 1.7446 | 3.44E−03 | 10000 | 1.6000 | 1.60E−04 | 750 | 1.6000 | 2.13E−03 | 1.6000 |

1.3 Characterization

Fourier Transformed Infrared (FTIR) spectroscopy was used to characterize the pre-polymers prepared. The liquid pre-polymer was spread on a potassium bromide (KBr) plate as a thin film prior to obtaining the spectrum. Attenuated Total Reflectance Fourier Transformed Infrared spectroscopy (ATR-FTIR) was utilized to characterize the coating surfaces after water aging. Bruker Vertex 70 with Harrick's ATR™ accessory using a hemispherical Ge crystal was used to obtain ATR-FTIR spectrum of coatings.

Figure 2:
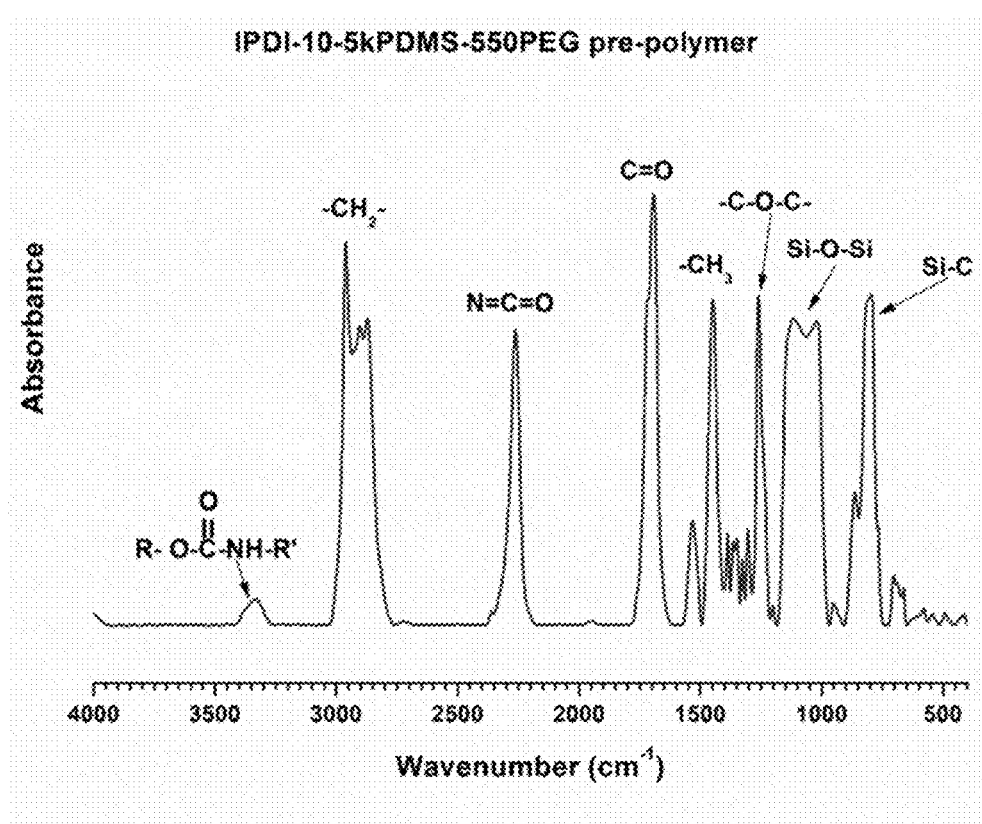
FIG. 2 depicts the FTIR of the liquid pre-polymer IPDI-10%-5kPDMS-550PEG.

FIG. 2 shows the FTIR of the liquid pre-polymer IPDI-10%-5kPDMS-550PEG. The peak at approximately 2200 $cm^{-1}$ indicates the presence of residual, unreacted isocyanate which is used for crosslinking with the acrylic polyol later. The peak at 3300-3400 $cm^{-1}$ due to N—H stretching shows successful reaction of isocyanate with OH-PDMS and m-PEG. This could also be supported by the presence of carbamate (C═O) peak at 1690 $cm^{-1}$. The ether stretching (—C—O—C—) due to ethylene glycol is also present in the FTIR spectrum at 1210 $cm^{-1}$. Presence of siloxane (—Si—O—Si—) stretching can be seen at 1000-1100 $cm^{-1}$.

Figure 3:
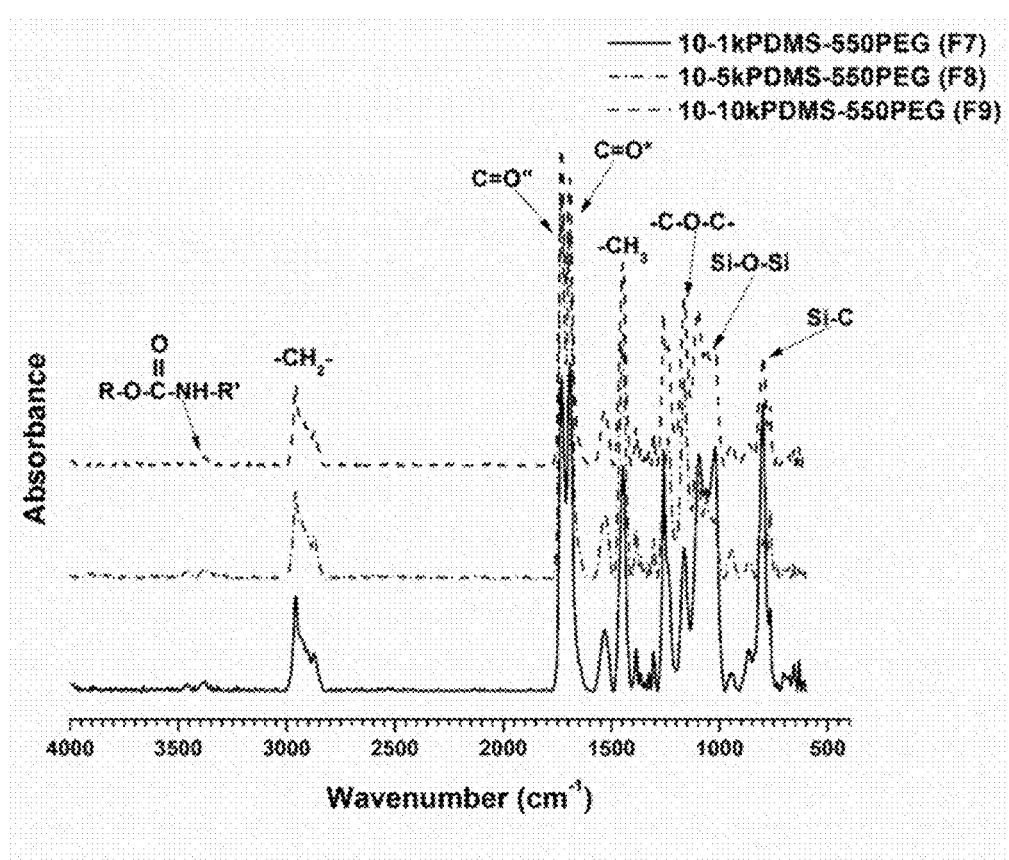
FIG. 3 depicts the normalized ATR-FTIR for coatings 7, 8, and 9 (described below).

ATR-FTIR provided information about chemical functional groups present on the top surface of solid materials. Typical penetration depth of ATR-FTIR varies from 0.5 to 2 μm depending on the angle of incidence, wavelength of light, and the refractive indices of ATR crystal and the material of interest. FIG. 3 shows the normalized ATR-FTIR for IPDI-10%-PDMS-550PEG pre-polymer containing coating formulations 7, 8, and 9 (Table 5) after water immersion. These coatings have 10% PDMS and PEG content (based on the total solids) with m-PEG 550 being used in all three. However, the PDMS molecular weight was varied from 1000, 5000, to 10000. FTIR spectrum shows the presence of —C—O—C— (1180 $cm^{-1}$) and —Si—O—Si— (1020-1100 $cm^{-1}$) functionalities, suggesting the presence of both PEG and PDMS. However, the intensity of —Si—O—Si— (1020-1100 $cm^{-1}$) and Si—$CH_3$ (790 $cm^{-1}$) peaks are slightly lower in coatings 8 and 9 compared to coating 7. Simultaneously, the peaks corresponding to PEG are slightly lower in intensity for coating 7 compared to the other two coatings. Therefore, coating 7 may have higher concentration of siloxane closer to the surface compared to other two coatings. The spectrum shows presence of two types of carbonyl groups C═O" (1750 $cm^{-1}$) and C═O* (1690 $cm^{-1}$). The C═O" corresponds to the carbonyl on acrylic polyol and the C═O* corresponds to the carbamate group. The peak for R—O—C(O)—NH—R' is weak but visible at (3350-3450 $cm^{-1}$), suggesting very lower concentration closer to the coating surface.

1.4 Coating Formulation

After prepolymer formulation, additional isocyanate (5.0039 g) was added along with acrylic polyol (13.7926 g, BA:HEA 80:20 in 50% toluene) and pot life extender acetylacetone (0.3200 g). The overall isocyanate to total hydroxyl equivalence was maintained at 1.1:1 for the final formulation. The content was thoroughly mixed using the vortex followed by magnetic stirring for 1 hour. Table 3 describes a composition of the coating formulations of the invention.

TABLE 3

Composition of Coating Formulation (Part 2)

IPDI-10-1KPDMS-550PEG-coating formulation part 2

| Ingredients | Mw (g/mol) | Amount (g) | Wt. % | Eq. Wt (g/eq) | Eq | % Solids | Amount Added (g) |
|---|---|---|---|---|---|---|---|
| Isocyanate (Desmodur Z 4470 BA) | | 3.5027 | 21.8920 | 355 | 9.87E−03 | 70 | 5.0039 |
| Acrylic Polyol | | 6.8963 | 43.1020 | 650 | 1.06E−02 | 50 | 13.7926 |
| Acetylacetone | | 0.3200 | 2.0000 | — | — | 100 | 0.3200 |

Formulation was deposited into microtiter plates and drawdowns were prepared on primed aluminum panels. For depositions, 250 μL of formulation were dispensed using an automatic pipette to each well. Drawdowns were made using a wire-wound drawdown bar with a wet film thickness of 80 μm on 8"×4" primed aluminum panels. Both microtiter plates and coated panels were allowed to cure under ambient conditions for 24 hrs. The following day, all the coatings were cured at 80° C. for 45 min.

Table 4 describes exemplary coating compositions made according to the invention.

isocyanate to other functional group (hydroxyl and amine) ratio was kept at 1.1:1. Drawdowns were made using a wire wound drawdown bar with 80 μm dry film thickness on 8"×4" aluminum panels previously primed with Intergard 264 primer. Formulation was deposited into microtiter plates, 250 μL of formulation were dispensed using an automatic pipette to each well. The coatings were allowed to cure for 24 hours under ambient conditions inside a dust free cabinet, followed by force curing in the oven at 80° C. for 45 minutes. Table 5 describes the list of control coatings.

TABLE 4

Coating Compositions

| Formulation # | Type of pre-polymer used | Type of PDMS | Overall Wt. % PDMS | Type of PEG | Overall Wt. % PEG |
|---|---|---|---|---|---|
| 1 | IPDI-5-1kPDMS-550PEG | PDMS-1k | 5 | m-PEG-550 | 5 |
| 2 | IPDI-5-5kPDMS-550PEG | PDMS-5k | 5 | m-PEG-550 | 5 |
| 3 | IPDI-5-10kPDMS-550PEG | PDMS-10k | 5 | m-PEG-550 | 5 |
| 4 | IPDI-5-1kPDMS-750PEG | PDMS-1k | 5 | m-PEG-750 | 5 |
| 5 | IPDI-5-5kPDMS-750PEG | PDMS-5k | 5 | m-PEG-750 | 5 |
| 6 | IPDI-5-10kPDMS-750PEG | PDMS-10k | 5 | m-PEG-750 | 5 |
| 7 | IPDI-10-1kPDMS-550PEG | PDMS-1k | 10 | m-PEG-550 | 10 |
| 8 | IPDI-10-5kPDMS-550PEG | PDMS-5k | 10 | m-PEG-550 | 10 |
| 9 | IPDI-10-10kPDMS-550PEG | PDMS-10k | 10 | m-PEG-550 | 10 |
| 10 | IPDI-10-1kPDMS-750PEG | PDMS-1k | 10 | m-PEG-750 | 10 |
| 11 | IPDI-10-5kPDMS-750PEG | PDMS-5k | 10 | m-PEG-750 | 10 |
| 12 | IPDI-10-10kPDMS-750PEG | PDMS-10k | 10 | m-PEG-750 | 10 |

Figure 4:
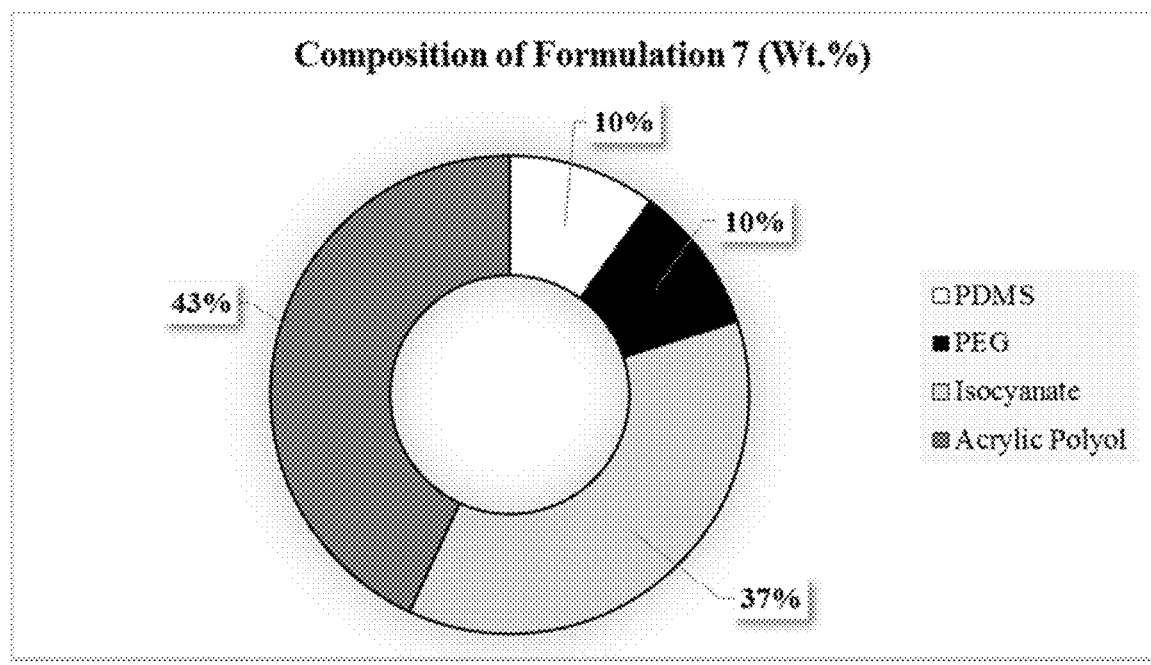
FIG. 4 shows the composition of basic ingredients in formulation 7 (described below) based on weight percent.

All other consequent formulations were also prepared following a similar procedure. PDMS and PEG levels of 5% and 10% were used based on the overall coating formulation. FIG. 4 shows the composition of basic ingredients based on solids of the main ingredients in formulation 7 (described above) based on weight percent. Additional solvent, catalyst (solution), and pot life extender were also included.

1.5 Control Coatings

All commercially available coatings were prepared following the technical data sheets provided by the suppliers. A brief description of the procedure followed to prepare siloxane polyurethane fouling release coatings is described here. The non-reactive components, such as, APT-PDMS (20% by wt.), acrylic polyol, and pot life extender, were combined in a glass container and allowed to mix overnight. On the next day, isocyanate (Desmodur 4470BA) and catalyst (0.05% by wt. from a 1% MAK solution) were added. The formulation was allowed to mix for about an hour. The

TABLE 5

List of Control Coatings

| Coating | Control Name | Description |
|---|---|---|
| 13 | A4-20% | Internal Siloxane-PU FR Control |
| 14 | Hempasil X3 | Silicone Hydrogel based Commercial FR Control |
| 15 | NDSU-PU | Pure Polyurethane |
| 16 | Dow T2 | Silicone Elastomer |
| 17 | IS 700 | Intersleek Commercial FR Control |
| 18 | IS 900 | Intersleek Commercial FR Control |
| 19 | IS 1100SR | Intersleek Commercial FR (Slime Release) Control |

1.6 Water Aging and Biological Assay Tests

All the coatings were subjected to a pre-leaching process for 28 days. Coated plates and panels were placed in a water tank that was automatically emptied and refilled every hour. Following the pre-leaching process, a leachate toxicity study was conducted to ensure non-toxicity of the coatings. All the experimental coatings displayed non-toxicity. Next, bacteria (*C. lytica*), algae (*N. incerta*), barnacle (*A. amphitrite*), and mussel (*G. demissa*) assays were conducted. Detailed description of the assay tests use can be found in Casse et al., Biofouling 2007, 23 (3/4), 267-276; Stafslien et al., Biofouling 2007, 23 (1), 37-44; and Webster et al., Biofouling 2007, 23 (3/4), 179-192, which are incorporated herein by reference (Casse et al. 2007)' (Stafslien et al. 2007)' (Webster et al. 2007).

Figure 5:
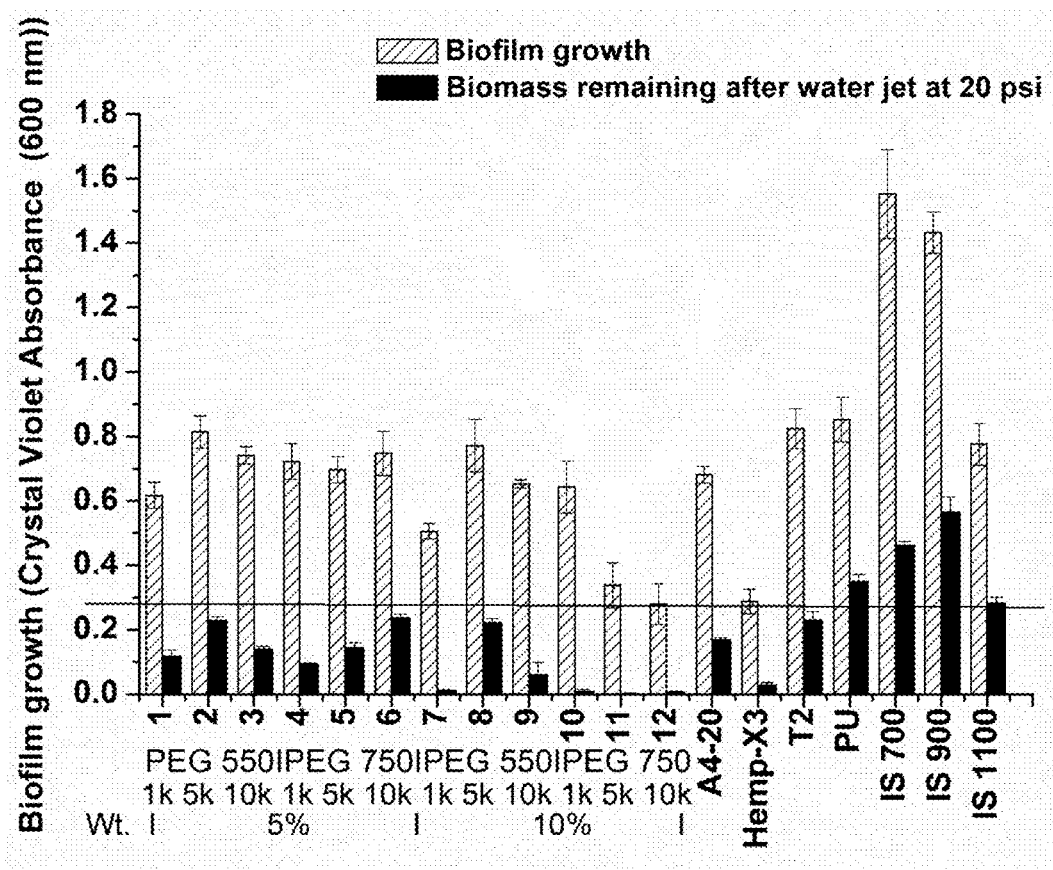
FIG. 5 shows the bacterial biofilm (*Cellulophaga lytica*) growth and retention after water-jet treatment at 20 Psi pressure.
Figure 6:
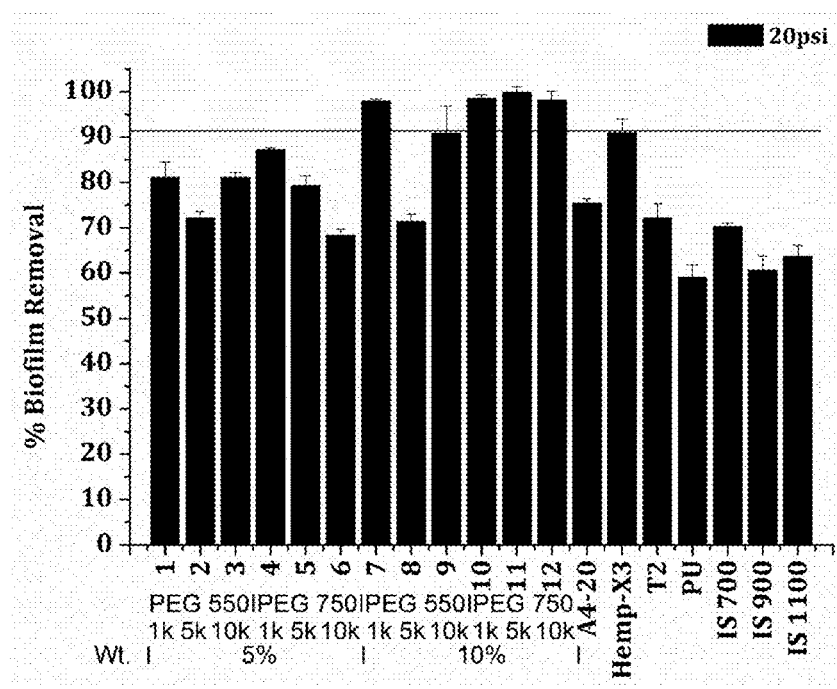
FIG. 6 shows the percent removal of bacterial biofilm (*Cellulophaga lytica*) after water-jet treatment at 20 Psi pressure.

Fouling release performance towards marine bacterium *Cellulophaga lytica* for experimental and control coatings were evaluated by a retention and retraction assay followed by water-jet treatment to evaluate adhesion (FIGS. 5 and 6). FIG. 5 shows the bacterial biofilm (*Cellulophaga lytica*) growth and retention after water-jet treatment at 20 Psi pressure. FIG. 6 shows the percent removal of bacterial biofilm (*Cellulophaga lytica*) after water-jet treatment at 20 Psi pressure.

Absorbance of crystal violet at 600 nm wavelength is directly proportional to the biomass present. Bacterial biofilm growth and retention for coatings with IPDI-10-1kP-DMS-750PEG, IPDI-10-5kPDMS-750PEG, and IPDI-10-10kPDMS-750PEG pre-polymers showed comparable results to Hempasil X3 commercial FR coating. These compositions show almost complete removal of biofilms after water-jet. Also, the coatings 7 and 9 displayed >90% biofilm removal upon treatment of water-jet at 20 psi pressure. In general, coatings 7, 9, 10, 11, and 12 were on par with commercial fouling release coatings from International Paint in terms of bacterial biofilm removal. Overall, the several IPDI-PEG-PDMS pre-polymer modified coatings demonstrated significantly improved fouling release performance towards *Cellulophaga lytica* compared to A4-20% 1$^{st}$ generation siloxane polyurethane formulation. Results from bacterial biofilm assay suggests that *Cellulophaga lytica* have lower affinity towards IPDI-PEG-PDMS pre-polymer modified siloxane polyurethane coatings.

Figure 7:
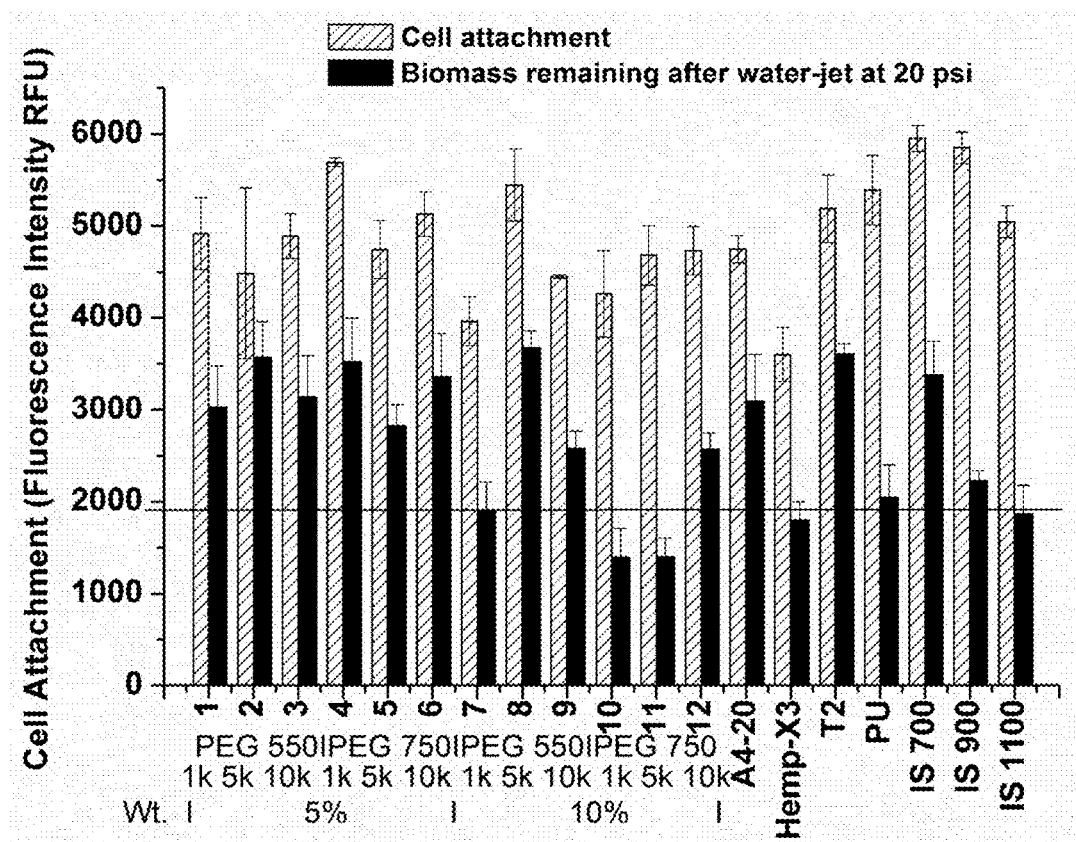
FIG. 7 shows the microalgae (*Navicula incerta*) attachment and retention after water-jet treatment at 20 Psi pressure.
Figure 8:
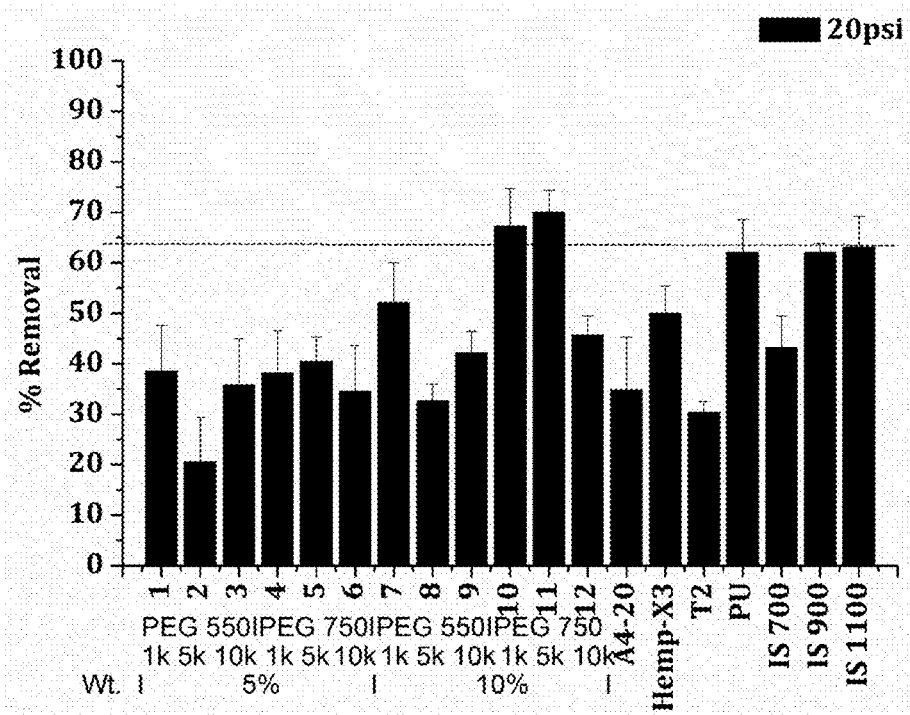
FIG. 8 shows the percent removal of microalgae (*Navicula incerta*) after water-jet treatment at 20 Psi pressure.

Fouling release performance towards slime forming diatoms *Navicula incerta* were evaluated using a similar assay (FIGS. 7 and 8). FIG. 7 shows the microalgae (*Navicula incerta*) attachment and retention after water-jet treatment at 20 Psi pressure. FIG. 8 shows the percent removal of microalgae (*Navicula incerta*) after water-jet treatment at 20 Psi pressure.

The amount of biomass was determined using the chlorophyll extraction. Coating compositions 7, 10, and 11 showed the lowest retention of diatoms after 20 psi water-jet treatment, which is similar to the performance of Intersleek 1100 SR, Intersleek 900, Polyurethane, and Hempasil X3. Coatings with IPDI-10-1kPDMS-750PEG and IPDI-10-5kPDMS-750PEG pre-polymers showed significant improvement in diatom removal compared to A4-20 siloxane polyurethane formulation. Thus suggesting that micro algae *Navicula incerta* have lower adhesion towards pre-polymers with longer PEG chains. In general, it has been a challenge to find a coating composition that provides good fouling release performance towards both *Cellulophaga lytica* and *Navicula incerta*, mainly due to their opposite preference for surface wettability. *Cellulophaga lytica* preferentially adheres to hydrophilic surfaces whereas *Navicula incerta* preferentially adheres to hydrophobic surfaces (Bodkhe et al. 2012a). Coating formulations 10 and 11 appeared to address that issue since both showed the best fouling release performance towards bacteria and diatoms.

Figure 9:
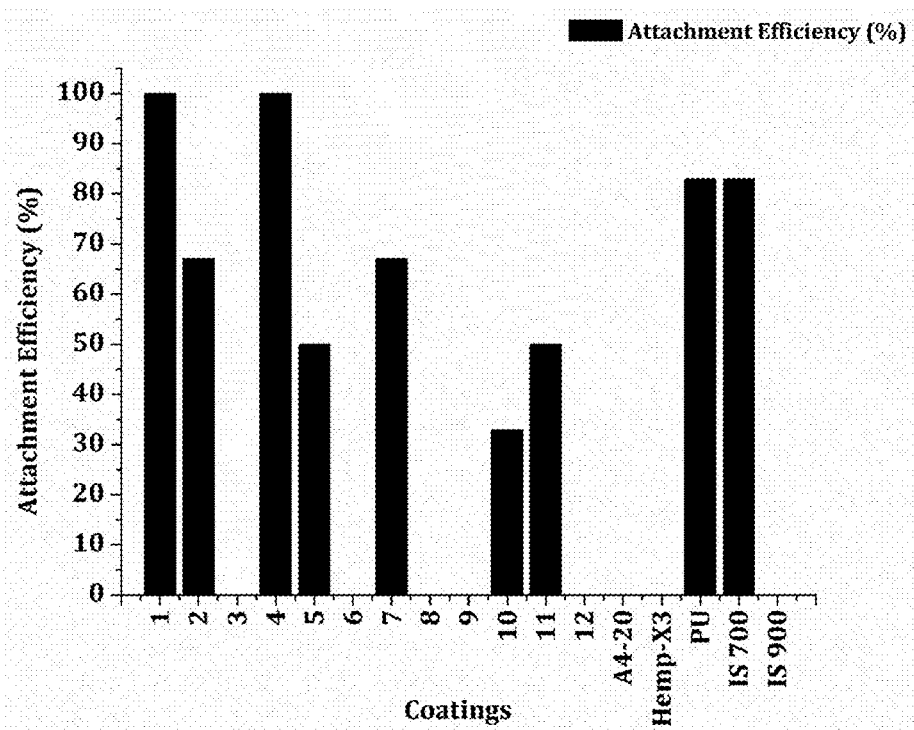
FIG. 9 shows the attachment efficiency of mussels (*Geukensia demissa*) based on 6 mussel attachment attempts.
Figure 10:
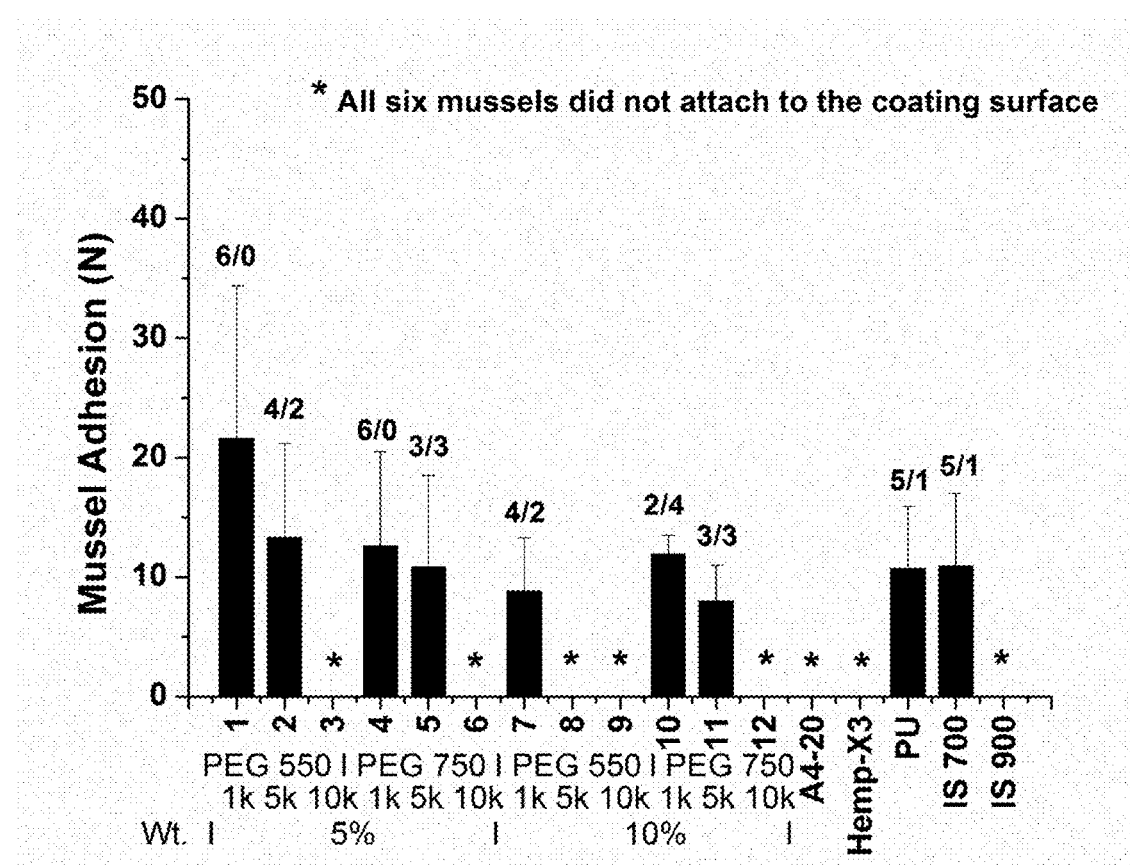
FIG. 10 shows the mussel adhesion (*Geukensia demissa*) based on attached mussels.

Several experimental coatings with IPDI-PEG-PDMS pre-polymer coatings showed no mussel attachment, suggesting that mussels did not prefer to settle on these coatings (FIGS. 9 and 10). FIG. 9 shows the attachment efficiency of mussels (*Geukensia demissa*) based on 6 mussel attachment attempts. FIG. 10 shows the mussel adhesion (*Geukensia demissa*) based on attached mussels, 6 mussel attachment attempts. Similarly, Intersleek 900, Hempasil X3, and A4-20 control showed no mussel attachment. However, the coating compositions that demonstrated excellent fouling release performance towards bacteria and diatoms showed some mussel attachment, although they were easily removed with approximately 10 N force. Out of the coatings that displayed some mussel attachments, coatings 10 and 11 showed the lowest number of mussel attachment and lower force for removal, suggesting good overall fouling release performance towards all three organisms.

Figure 11:
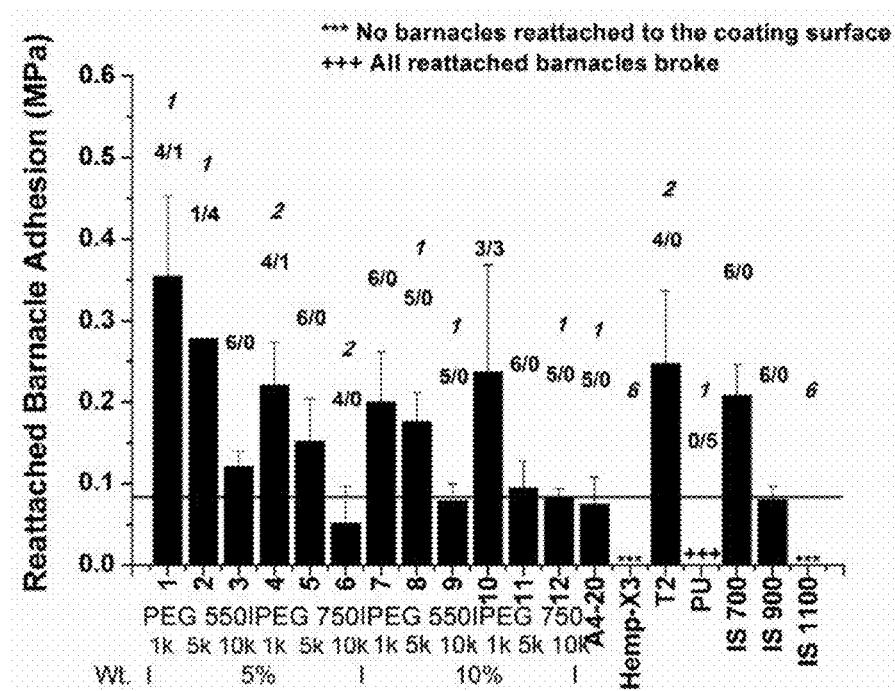
FIG. 11 shows reattached barnacle (*Amphibalanus amphitrite*) adhesion strength. Six barnacles were used for each reattachment study, out of which italicized numbers represent the non-attached barnacles. The ratio represents the number of released barnacles versus the number of broken/damaged barnacles during push off measurements. Each bar represents the average adhesion strength based on the number of successfully pushed barnacles.

Barnacle adhesion strength towards coatings was evaluated using a two week reattachment assay followed by a push off test. Adhesion strength (or critical removal stress) was quantified by shear force for removal divided by barnacle basal plate area. The effects of PDMS MW was clearly seen by the barnacle adhesion strength for AmSiPU coatings (FIG. 11). Coatings containing pre-polymers modified with shorter PDMS chains showed high barnacle adhesion strength. The opposite behavior was observed for coatings modified with longer PDMS chains (10000). Also the coatings with higher PDMS MW had no broken barnacles, which is further evidence that PDMS MW had a significant effect on easy release of barnacles attached to surfaces. Several experimental coatings showed non-attached barnacles and lower adhesion strengths that were comparable to Intersleek® 900 performance. Coatings 3, 6, 9, 11, and 12 displayed the best performance allowing removal of all reattached barnacles with lower adhesion strengths. On these coatings, several barnacles were unable to re-attach; further indicator of good FR performance. Coatings consisting of pre-polymer with 10% concentration of PDMS and PEG provided the better FR performance towards barnacles compared to those with 5%. Surface wettability and surface charge play an important role in barnacle settlement. It is often observed that PDMS based materials show low critical removal stress of barnacles (*A. amphitrite*) which is attributed to their low surface energy. However AmSiPU coatings with both hydrophilic PEG and hydrophobic PDMS displayed lower barnacle adhesion strengths. This assay demonstrates the important role of PDMS being an essential component in amphiphilic fouling release system. Compared to previous attempts of amphiphilic siloxane-PU coatings, IPDI-PDMS-PEG pre-polymer modified coatings were able to maintain good fouling release towards barnacles while improving performance towards microfoulers. The control coating polyurethane (no PDMS), showed the worst performance towards barnacles on which all reattached barnacles broke. Hempasil® X3 and Intersleek 1100SR showed the best performance by not allowing any barnacle to reattach during the two weeks of immersion in artificial sea water. FIG. 11 shows reattached barnacle (*Amphibalanus amphitrite*) adhesion strength. Six barnacles were used for each reattachment study, out of which italicized numbers represent the non-attached barnacles. The ratio represents the number of released barnacles versus the number of broken/damaged barnacles during push off measurements. Each bar represents the average adhesion strength based on the number of successfully pushed barnacles.

1.7 Conclusion

Isophorone diisocyanate-Polyethylene glycol-Polydimethyl siloxane (IPDI-PEG-PDMS) pre-polymers of the invention were synthesized by reacting IPDI trimer with monocarbinol-terminated polydimethyl siloxane and m-PEG. Later, these pre-polymers were incorporated in to siloxane polyurethane coatings. ATR-FTIR suggests that both siloxane and PEG are pre-dominant on the surface after water aging. Several coatings showed excellent fouling release performance towards bacteria (*Cellulophaga lytica*) having >90% removal. Coatings 10 and 11 with 10-1kP-DMS-750PEG and IPDI-10-5kPDMS-750PEG pre-polymers displayed significantly better fouling release performance towards microalgae (*Navicula incerta*) surpassing 1$^{st}$ generation siloxane polyurethane formulation and on par with newest Intersleek fouling release coatings. Interestingly, coatings that had average fouling release performance towards bacteria showed no mussel attachments. Although coating 10 and 11 displayed few mussel (*Geukensia demissa*) attachments, they were easily removed with smaller force. Overall, the IPDI-PEG-PDMS pre-polymers of the invention improve fouling release performance of non-toxic siloxane polyurethane marine coatings.

Example 2

2.1 Materials

Polyisocyanates Desmodur Z4470 BA and Desmodur N3300 A were provided by Covestro LLC. An acrylic polyol composed of 80% butyl acrylate and 20% 2-hydroxyethyl acrylate was synthesized via conventional free radical polymerization and diluted up to 50% with toluene. Polyester diol CAPA™ 2054 was provided by Perstorp. Monocarbinol terminated polydimethyl siloxane (PDMS) in two molecular weights (MCR-C18:5000, MCR-C22:10000 g/mole) was purchased from Gelest Inc. Amino-propyl terminated polydimethyl siloxane (APT-PDMS) with a molecular weight of 20000 g/mole was synthesized at NDSU through a ring opening equilibration reaction. Ethyl-3-ethoxypropionate (EEP), methyl amyl ketone, acetylacetone, dibutyltin diacetate, polyethylene glycol methyl ether (PEG 750), and butyl acetate were purchased from Sigma Aldrich.

2.2 Synthesis

Commercially available IPDI trimer (Desmodur Z4470 BA) and HDI trimer (Desmodur N3300 A) were modified using PDMS and PEG to design pre-polymers with many different compositions. A general procedure for pre-polymer IPDI-10PEG-10PDMS5k-5PDMS10k (Formulation 3) modified by PDMS (MW=5000 and 10000) and PEG (MW=750) will be described here (The amount of PDMS 5000 and PEG are each 10% by wt. and PDMS 10000 is 5% by weight based on the total weight of the polyurethane). First PEG (1.6000 g) was dissolved in EEP (1.6000 g) in a 20 mL vial using mixing by vortex for 5 minutes. Next, a magnetic stir bar and PDMS 5000 (1.6000 g) and PDMS 10000 (0.8000 g) were added and vortexed for an additional 2 minutes. Isocyanate (1.9271 g) and DBTDAc catalyst solution (1% by wt. in MAK) (0.3200 g) were then added to the vial. Contents of the vial were then mixed using a vortex mixer for 5 minutes followed by stirring for 24 hours using a magnetic stir plate. Throughout the pre-polymers, the total isocyanate to hydroxyl equivalents ratio was sustained at 3:2. Details of other formulations can be found in Table 6.

2.3 Coating Formulation and Curing

Coating formulation for the pre-polymer described is included here. Acrylic polyol (13.1606 g) and acetyl acetone pot life extender (0.3200 g) were added into the vial containing the pre-polymer. The vial was then mixed via vortex for 2 minutes followed by additional isocyanate (5.8152 g) and DBTDAc (0.1600 g). The overall isocyanate to hydroxyl ratio was maintained at 1.1:1 for final formulation. The contents were then thoroughly mixed using a vortex mixer and followed by magnetic stirring for 1 hour. Formulations were then deposited into multi-well plates and drawdowns were done on primed aluminum panels. The coating formulations (250 μL) were deposited using an automatic repeat pipette for each well. Drawdowns were made using a wire drawdown bar leaving a wet film thickness at 80 μm on 8"×4" primed aluminum panels. Coatings were cured at ambient conditions for 24 hours then oven cured for 45 minutes at 80° C. All other formulations were prepared following similar procedure as outlined above. For this study, PDMS levels of 5%, 10%, and 15% along with PEG levels of 10% and 15% based on coating formulation were considered. Table 6 shows the 11 experimental coatings evaluated in this study.

TABLE 6

Pre-polymer compositions considering formulation variables.

| | | Pre-polymer composition | | | | | Polyurethane bulk composition | |
|---|---|---|---|---|---|---|---|---|
| | Name Label | Type of NCO | Type of PEG | Amount of PEG | Type of PDMS | Amount of PDMS | Type of Polyol | Type of NCO |
| 1 | IPDI-10PEG-10PDMS5k | IPDI | PEG 750 | 10% | PDMS 5k | 10% | AP | IPDI |
| 2 | IPDI-15PEG-15PDMS5k | IPDI | PEG 750 | 15% | PDMS 5k | 15% | AP | IPDI |
| 3 | IPDI-10PEG-10PDMS5k-5PDMS10k | IPDI | PEG 750 | 10% | PDMS 5k PDMS 10k | 10% 5% | AP | IPDI |
| 4 | IPDI-15PEG-10PDMS5k-5PDMS10k | IPDI | PEG 750 | 15% | PDMS 5k PDMS 10k | 10% 5% | AP | IPDI |
| 5 | IPDI-15PEG-15PDMS5k | IPDI | PEG 750 | 15% | PDMS 5k | 15% | PCLP | IPDI |
| 6 | HDI-15PEG-15PDMS5k | HDI | PEG 750 | 15% | PDMS 5k | 15% | AP | IPDI |
| 7 | HDI-15PEG-10PDMS5k-5PDMS10k | HDI | PEG 750 | 15% | PDMS 5k PDMS 10k | 10% 5% | AP | IPDI |
| 8 | HDI-15PEG-15PDMS5k | HDI | PEG 750 | 15% | PDMS 5k | 15% | AP | HDI |
| 9 | HDI-10PEG-10PDMS5k-5PDMS10k | HDI | PEG 750 | 10% | PDMS 5k PDMS 10k | 10% 5% | AP | HDI |
| 10 | HDI-15PEG-10PDMS5k-5PDMS10k | HDI | PEG 750 | 15% | PDMS 5k PDMS 10k | 10% 5% | AP | HDI |
| 11 | IPDI-15PEG-10PDMS5k-5PDMS10k | IPDI | PEG 750 | 15% | PDMS 5k PDMS 10k | 10% 5% | AP | HDI |

TABLE 6-continued

Pre-polymer compositions considering formulation variables.

| | Name Label | Pre-polymer composition | | | | Polyurethane bulk composition | | |
|---|---|---|---|---|---|---|---|---|
| | | Type of NCO | Type of PEG | Amount of PEG | Type of PDMS | Amount of PDMS | Type of Polyol | Type of NCO |
| 12 | A4-20 | | | | Control | | | |
| 13 | Hempasil X3 | | | | Control | | | |
| 14 | Dow T2 | | | | Control | | | |
| 15 | PU | | | | Control | | | |
| 16 | IS900 | | | | Control | | | |
| 17 | IS1100SR | | | | Control | | | |

Table 7 shows the isocyanate values for several pre-polymers. Isocyanate values for these prepolymers were similar to the theoretical values indicating the successful synthesis.

TABLE 7

Percent isocyanate for chosen pre-polymers

| Pre-polymer Formulation | Theoretical % NCO | Experimental % NCO |
|---|---|---|
| IPDI-10PEG750-10PDMS5k | 2.20 | 2.10 ± 0.447 |
| IPDI-15PEG750-15PDMS5k | 2.18 | 2.21 ± 0.215 |
| IPDI-15PEG750-10PDMS5k-5PDMS10k | 2.12 | 1.81 ± 0.180 |
| HDI-15PEG750-15PDMS5k | 2.48 | 2.23 ± 0.188 |
| HDI-15PEG750-10PDMS5k-5PDMS10k | 2.67 | 2.03 ± 0.204 |

Figure 12:
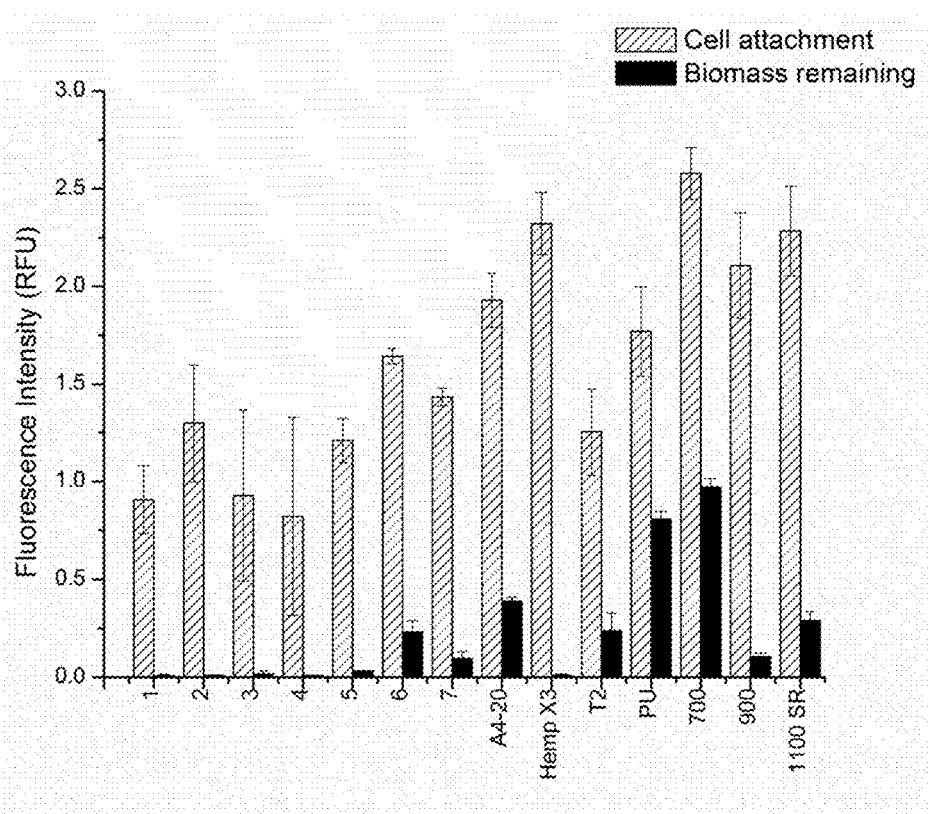
FIG. 12 shows bacterial biofilm (*Cellulophaga lytica*) growth and retention after water-jet treatment at 20 psi. Each bar demonstrates the average from 3 replicate measurements with standard deviation.
Figure 13:
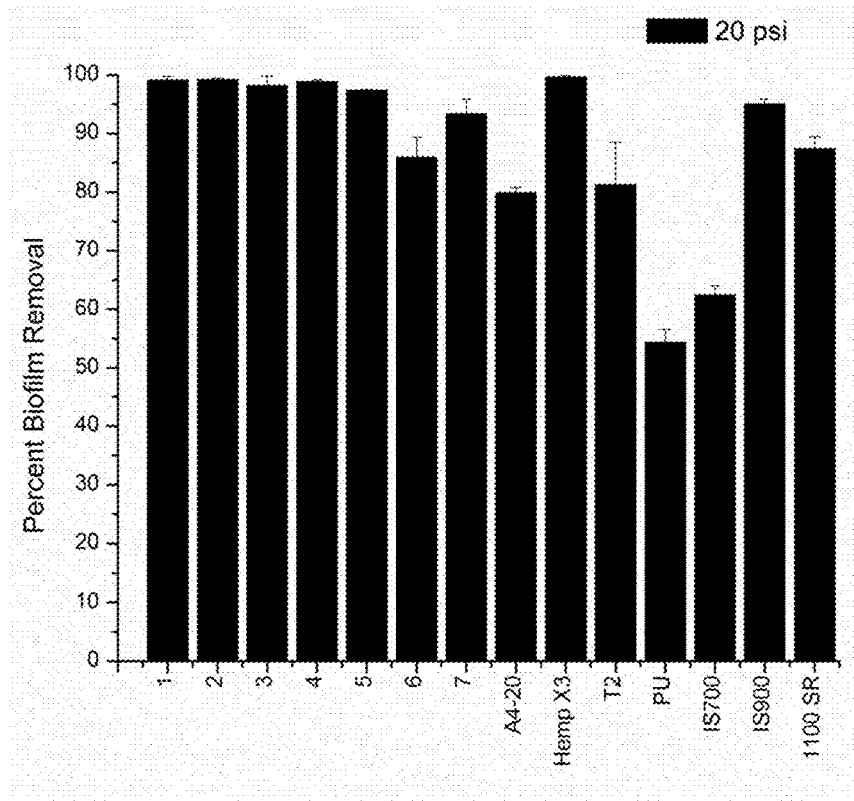
FIG. 13 shows bacterial biofilm (*Cellulophaga lytica*) removal after water-jet treatment at 20 psi. Each bar represents the average percent removal of the biofilm over six measurements with standard deviation.

FIG. 12 shows the C. lytica cell attachment and biomass remaining after water jet treatment. AmSiPU coatings displayed low cell attachment compared to commercial standards. Also coatings 1-5 showed excellent FR properties towards C. lytica biofilm. FIG. 13 features the percent removal of bacterial biofilm using the amount of cell attachment and biomass remaining. Coatings 1-5 showed ≈100% bacterial biofilm removal on par with Hempasil® X3 and exceeded the Intersleek® standards. All the AmSiPU coatings showed better FR properties compared to A4-20 internal control. Overall compositional changes in polyisocyanate pre-polymers and in polyurethane bulk did not seems to have significant effect on FR properties of AmSiPU coatings towards C. lytica.

Figure 14:
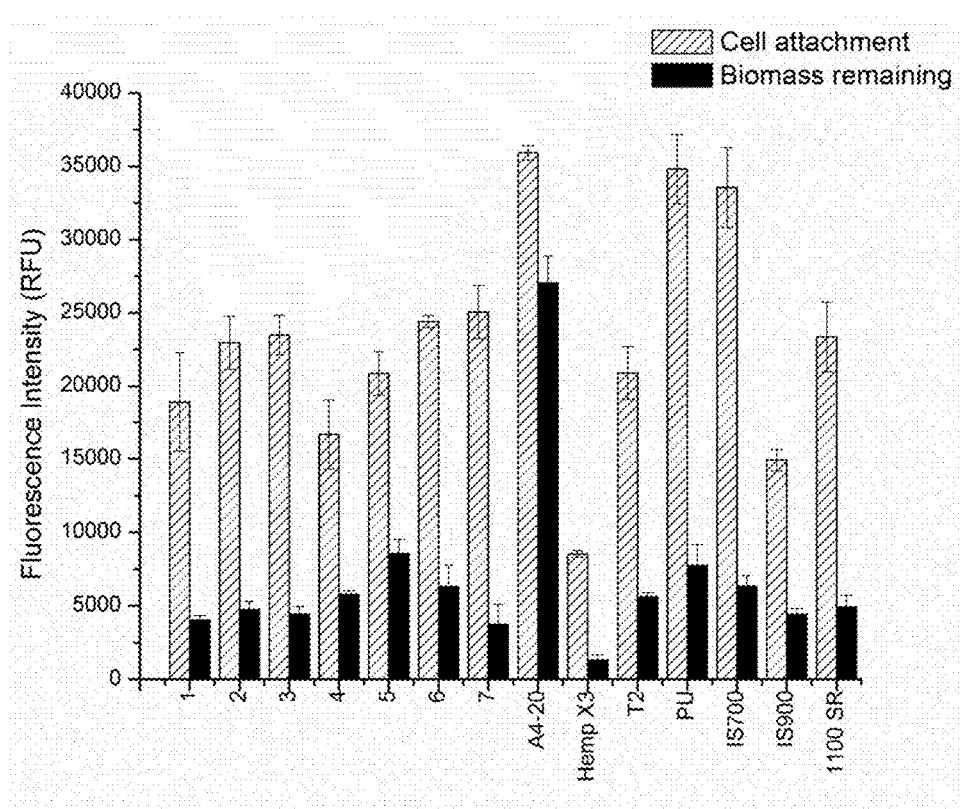
FIG. 14 shows diatom attachment and retention after water-jet treatment at 20 psi. Each bar represents the average of 3 replicate measurements along with standard deviation.
Figure 15:
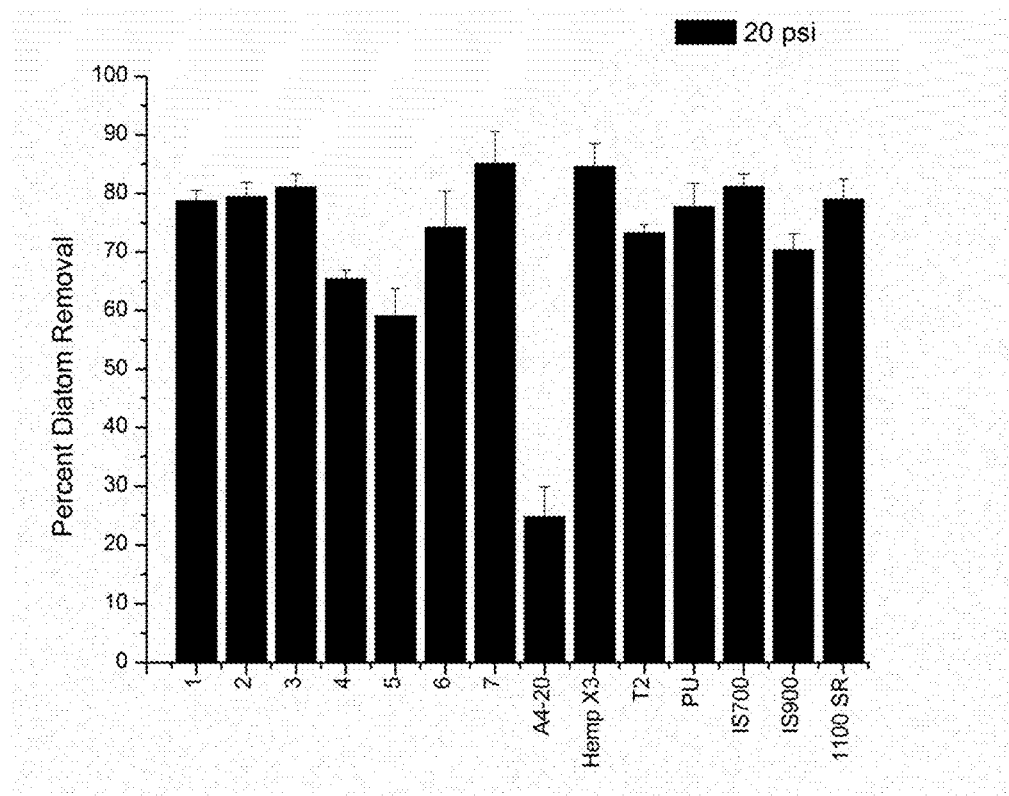
FIG. 15 shows diatom removal after water-jet treatment at 20 psi. Each bar represents the average percent removal over six measurements as well as standard deviation.

FIG. 14 shows the diatom (N. incerta) cell attachment and biomass remaining after water jet treatment at 20 psi. Initial N. incerta cell attachment of AmSiPU coatings were comparable to T2 silicone elastomer and Intersleek® 1100SR standard. However Hempasil® X3 demonstrated the lowest amount of N. incerta cell attachment and biomass left after cleaning. Following water jet treatment, many AmSiPU coatings had low biomass remaining which was comparable to standards Intersleek® 700, 900, and 1100SR. FIG. 15 shows the percent removal of diatom. All AmSiPU coatings show significant improvement in N. Incerta FR properties compared to the internal control A4-20. Coatings 1, 2, 3, 6 and 7 show ≈80% removal of diatom, comparable to commercial standards Hempasil® X3, and all Intersleek standards. Slight decrease in diatom removal for coatings 4 and 5 may be attributed to slight variation in composition.

REFERENCES

Bodkhe R B. 2011. Amphiphilic siloxane-polyurethane coatings [Ph.D.]. Ann Arbor: North Dakota State University. 313 p.

Bodkhe R B, Stafslien S J, Cilz N, Daniels J, Thompson S E M, Callow M E, Callow J A, and Webster D C. 2012a. Polyurethanes with amphiphilic surfaces made using telechelic functional PDMS having orthogonal acid functional groups. Progress in Organic Coatings 75(1-2):38-48.

Bodkhe R B, Thompson S E M, Yehle C, Cilz N, Daniels J, Stafslien S J, Callow M E, Callow J A, and Webster D C. 2012b. The effect of formulation variables on fouling-release performance of stratified siloxane-polyurethane coatings. Journal of Coatings Technology Research 9(3): 235-249.

Callow M E, and Callow J A. 2002. Marine biofouling: a sticky problem. Biologist 49(1):10.

Casse F, Ribeiro E, Ekin A, Webster D C, Callow J A, and Callow M E. 2007. Laboratory screening of coating libraries for algal adhesion. Biofouling 23(3/4):267-276.

Ekin A, and Webster D C. 2006. Combinatorial and High-Throughput Screening of the Effect of Siloxane Composition on the Surface Properties of Crosslinked Siloxane-Polyurethane Coatings. Journal of Combinatorial Chemistry 9(1):178-188.

Hellio C, and Yebra D M. 2009. Advances in marine antifouling coatings and technologies. Cambridge, UK: Woodhead Publishing Limited.

Iguerb O, Poleunis C, Mazéas F, Compère C, and Bertrand P. 2008. Antifouling Properties of Poly(methyl methacrylate) Films Grafted with Poly(ethylene glycol) Monoacrylate Immersed in Seawatert. Langmuir 24(21):12272-12281.

Konstantinou I K, and Albanis T A. 2004. Worldwide occurrence and effects of antifouling paint booster biocides in the aquatic environment: a review. Environment International 30(2):235-248.

Lejars M, Margaillan A, and Bressy C. 2012. Fouling Release Coatings: A Nontoxic Alternative to Biocidal Antifouling Coatings. Chemical Reviews 112(8):4347-4390.

Magin C M, Cooper S P, and Brennan A B. 2010. Non-toxic antifouling strategies. Materials Today 13(4):36-44.

Petrone L, Di Fino A, Aldred N, Sukkaew P, Ederth T, Clare A S, and Liedberg B. 2011. Effects of surface charge and Gibbs surface energy on the settlement behaviour of barnacle cyprids (Balanus amphitrite). Biofouling 27(9): 1043-1055.

Prime K L, and Whitesides G M. 1993. Adsorption of proteins onto surfaces containing end-attached oligo(ethylene oxide): a model system using self-assembled monolayers. Journal of the American Chemical Society 115 (23):10714-10721.

Sommer S, Ekin A, Webster D C, Stafslien S J, Daniels J, VanderWal L J, Thompson S E M, Callow M E, and Callow J A. 2010. A preliminary study on the properties and fouling-release performance of siloxane-polyurethane coatings prepared from PDMS macromers. Biofouling 26(8):961-972.

Stafslien S, Daniels J D, Chisholm B, and Christianson D. 2007. Combinatorial materials research applied to the development of new surface coatings III. Utilisation of a high-throughput multiwell plate screening method to rapidly assess bacterial biofilm retention on antifouling surfaces. Biofouling 23(1):37-44.

Szleifer I. 1997. Polymers and proteins: interactions at interfaces. Current Opinion in Solid State and Materials Science 2(3):337-344.

Webster D C, and Bodkhe R B. 2015. Functionalized silicones with polyalkylene oxide side chains. NDSU Research Foundation.

Webster D C, Chisholm B J, and Stafslien S J. 2007. Mini Review: Combinatorial approaches for the design of novel coatings systems. Biofouling 23(3/4):179-192.

Webster D C, and Ekin A. 2010. Functionalized Polysiloxane Polymers. In: patent US, editor. USA: NDSU Research Foundation.

Webster D C, Pieper R J, and Ekin A. 2011. Thermoset Siloxane-Urethane Fouling Release Coatings. In: patent US, editor. USA: NDSU Research Foundation.

Wyszogrodzka M, and Haag R. 2009. Synthesis and Characterization of Glycerol Dendrons, Self-Assembled Monolayers on Gold: A Detailed Study of Their Protein Resistance. Biomacromolecules 10(5):1043-1054.

Yebra D M, Kiil S, and Dam-Johansen K. 2004. Antifouling technology-past, present and future steps towards efficient and environmentally friendly antifouling coatings. Prog Org Coat 50:75-104.

The claimed invention is:

1. A curable polyurethane coating composition comprising:
   a) a prepolymer made by reacting at least one polyisocyanate with
      i) at least one monocarbinol-terminated poly(dimethylsiloxane); and
      ii) at least one methoxy-terminated poly(ethylene glycol);
   b) at least one polyol; and
   c) at least one polyisocyanate crosslinker,
   wherein the polyisocyanate in a) may be the same or different as the polyisocyanate crosslinker c).

2. A curable coating composition of claim 1, wherein the prepolymer has a 3:2 isocyanate to hydroxyl ratio and having 5-10 weight % of polyl(dimethylsiloxane) and poly(ethylene glycol) content based on the overall coating formulation.

3. A curable coating composition of claim 2, wherein the polyisocyanate is a trimer of methylene diphenyl diisocyanate, hexamethylene diisocyanate, or isophorone diisocyanate; and
   the polyol is an acrylic polyol or a polyether polyol.

4. A prepolymer of claim 2, wherein:
   the monocarbinol-terminated poly(dimethylsiloxane) has a molecular weight from 500 to 15,000 g/mole, and
   the methoxy-terminated poly(ethylene glycol) has a molecular weight ranging from 400 to 1,000 g/mole.

5. A curable coating composition of claim 2, wherein:
   the prepolymer (a) is present in an amount ranging from 20 wt. % to 60 wt. %,
   the polyol (b) is present in an amount ranging from 20 wt. % to 60 wt. %, and
   the polyisocyanate crosslinker is present in an amount ranging from 10 wt. % to 40 wt. %;
   further comprising a solvent in an amount from 0.5 wt. % to 50 wt. %, and
   having an overall isocyanate to total hydroxyl ratio of 1.2:1 or 1.1:1.

6. The curable coating composition of claim 5, wherein the polyisocyanate is a polyisocyanate derived from isophorone diisocyanate and the polyol is an acrylic polyol.

7. A curable coating composition of claim 1, having an overall isocyanate to total hydroxyl equivalence where the isocyanate is in a slight molar excess.

8. A curable coating composition of claim 1, wherein:
   the prepolymer (a) is present in an amount ranging from 20 wt. % to 60 wt. %,
   the polyol (b) is present in an amount ranging from 20 wt. % to 60 wt. %, and
   the polyisocyanate crosslinker is present in an amount ranging from 10 wt. % to 40 wt. %;
   further comprising a solvent in an amount from 0.5 wt. % to 50 wt. %, and
   having an overall isocyanate to total hydroxyl ratio of 1.2:1 or 1.1:1.

9. The curable coating composition of claim 8, wherein the polyisocyanate is a polyisocyanate derived from isophorone diisocyanate and the polyol is an acrylic polyol.

10. A cured coating composition of claim 1.

11. An object coated with the coating composition of claim 1.

12. An object of claim 11, wherein the object is a boat hull.

13. A method for reducing or preventing biofouling of a surface exposed to an aqueous environment comprising the steps of:
   coating the surface with a curable coating composition of claim 1 to form a coated surface, and
   curing the coating composition on the coated surface.

14. A marine fouling-release coating having the composition of claim 1.

15. A prepolymer made by reacting at least one polyisocyanate with
   i) at least one monocarbinol-terminated poly(dimethylsiloxane); and
   ii) at least one methoxy-terminated poly(ethylene glycol).

16. A prepolymer of claim 15, wherein the prepolymer has a 3:2 isocyanate to hydroxyl ratio.

17. A prepolymer of claim 15, wherein the polyisocyanate is a trimer of methylene diphenyl diisocyanate, hexamethylene diisocyanate, or isophorone diisocyanate.

18. A prepolymer of claim 15, wherein:
   the monocarbinol-terminated poly(dimethylsiloxane) has a molecular weight from 500 to 15,000 g/mole, and
   the methoxy-terminated poly(ethylene glycol) has a molecular weight ranging from 400 to 1,000 g/mole.

* * * * *